(12) United States Patent
Hammer

(10) Patent No.: US 10,327,321 B2
(45) Date of Patent: Jun. 18, 2019

(54) CHAMBERS FOR MICROWAVE PLASMA GENERATION

(71) Applicant: Agilent Technologies, Inc., Santa Clara, CA (US)

(72) Inventor: Michael Ron Hammer, Sassafras (AU)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 15/749,430

(22) PCT Filed: Jul. 20, 2016

(86) PCT No.: PCT/IB2016/054300
§ 371 (c)(1),
(2) Date: Jan. 31, 2018

(87) PCT Pub. No.: WO2017/021808
PCT Pub. Date: Feb. 9, 2017

(65) Prior Publication Data
US 2018/0228012 A1 Aug. 9, 2018

(30) Foreign Application Priority Data

Jul. 31, 2015 (AU) ................................ 2015903047

(51) Int. Cl.
*H05H 1/30* (2006.01)
*H05H 1/46* (2006.01)
(Continued)

(52) U.S. Cl.
CPC .............. *H05H 1/30* (2013.01); *G01J 3/443* (2013.01); *H01J 49/105* (2013.01); *H05H 1/46* (2013.01); *H05H 2001/4622* (2013.01)

(58) Field of Classification Search
CPC .... H05H 1/30; H05H 1/46; H05H 2001/4622; H01J 49/105; G01J 3/443
See application file for complete search history.

(56) References Cited

U.S. PATENT DOCUMENTS

| 4,320,716 A | 3/1982 | Boulanger et al. |
| 4,965,540 A | 10/1990 | Sullivan |

(Continued)

FOREIGN PATENT DOCUMENTS

| DE | 4217900 A1 | 12/1993 |
| JP | 2004095985 A | 3/2004 |

(Continued)

OTHER PUBLICATIONS

Espacenet, et al., English Abstract of KR101468923 B1, Dec. 22, 2014, 1 page.

(Continued)

*Primary Examiner* — Dedei K Hammond
*Assistant Examiner* — Raymond R Chai

(57) ABSTRACT

A microwave chamber for plasma generation. The microwave chamber comprises a launch structure at a first end of the microwave chamber to accommodate a microwave source for producing microwave energy and a termination section at a second end of the microwave chamber opposite the first end. The termination section is configured to substantially block propagation of the microwave energy from the second end of the chamber. The microwave chamber further comprises an internal wall structure for guiding the microwave energy received within the microwave chamber at the first end toward the second end and defines a cavity. The internal wall structure comprises an impedance matching section intermediate the first end and the second end, and a capacitive loaded section intermediate the impedance matching section and the second end, wherein the capacitive loaded section comprises at least one ridge extending along a longitudinal axis of the chamber. The microwave chamber defines a first opening extending through a first wall of the capacitive loaded section and a second opening extending through a second wall of the capacitive loaded section. The (Continued)

second wall is opposite the first wall. The first opening and second opening are configured to cooperate with one another to receive a plasma torch in the capacitive loaded section along an axis extending through first opening and second opening and substantially perpendicular to the longitudinal axis of the chamber.

23 Claims, 11 Drawing Sheets

(51) Int. Cl.
*G01J 3/443* (2006.01)
*H01J 49/10* (2006.01)

(56) References Cited

U.S. PATENT DOCUMENTS

| | | | |
|---|---|---|---|
| 6,696,662 | B2 | 2/2004 | Jewett et al. |
| 7,091,441 | B1 | 8/2006 | Kuo et al. |
| 2006/0144520 | A1* | 7/2006 | Fink .................. B08B 7/0035 156/345.48 |
| 2006/0175302 | A1 | 8/2006 | Kuo |
| 2007/0029291 | A1* | 2/2007 | Boulos .................. B01J 19/088 219/121.59 |
| 2009/0020009 | A1* | 1/2009 | Zakrzewski ............. H05H 1/46 95/58 |
| 2012/0217875 | A1 | 8/2012 | Park |
| 2014/0263202 | A1* | 9/2014 | Partridge ............... B23K 10/02 219/121.48 |
| 2014/0265850 | A1 | 9/2014 | Vahidpour et al. |
| 2015/0221475 | A1* | 8/2015 | Okumura .............. H01J 37/321 438/710 |
| 2016/0358793 | A1* | 12/2016 | Okumura .......... H01L 21/67069 |

FOREIGN PATENT DOCUMENTS

| | | |
|---|---|---|
| KR | 1020100062715 A | 6/2010 |
| KR | 101468923 B1 | 12/2014 |
| WO | 0204930 A1 | 1/2002 |

OTHER PUBLICATIONS

KR20100062715 A, et al., English Abstract of KR20100062715 A, Jun. 10, 2010, 1 page.

Pack, B. W. et al., An Improved Microwave Plasma Torch for Atomic Spectrometry, Spectrochimica Acta, Part B, vol. 52, 1997, 2163-2168.

International Search Report for International Application No. PCT/IB2016/054300, dated Oct. 17, 2016.

Extended European Search Report dated Feb. 27, 2019, Application No. 16832383.0, 10 pages.

* cited by examiner

CHAMBERS FOR MICROWAVE PLASMA GENERATION

CROSS REFERENCE TO PRIOR APPLICATIONS

This application is a U.S. National Phase Filing under 35 U.S.C. § 371 of International Application No. PCT/IB2016/054300, filed on Jul. 20, 2016, which claims priority to AU Patent Application No. 2015903047, filed on Jul. 31, 2015, the contents of which are incorporated herein by reference in their entirety.

FIELD OF THE DISCLOSURE

This disclosure generally relates to microwave chambers, microwave plasma systems including such microwave chambers and methods for generating and sustaining plasma using microwave energy in such microwave chambers and microwave plasma systems. In some embodiments, this disclosure relates to such microwave chambers, systems and methods for use in spectroscopy.

BRIEF DESCRIPTION OF DRAWINGS

Embodiments are described in further detail below, by way of example, with reference to the accompanying drawings briefly described below.

FIG. 3a is a partial section perspective view of a microwave chamber of the microwave plasma generation system of FIG. 1 and FIG. 2 according to some embodiments;

FIG. 3b is an end view of the microwave chamber of FIG. 3a;

FIG. 4b is a cross-sectional top view of the microwave chamber shown in FIG. 4a;

FIG. 5b is a top view of the capacitive loaded section of FIG. 5a;

FIG. 7b is an illustrative plot of electric field strength of a microwave standing wave within the capacitive loaded section of FIG. 7a;

FIG. 9b is a side view of a capacitive loaded section of the microwave chamber shown in FIG. 9a;

DETAILED DESCRIPTION

Figure 1:
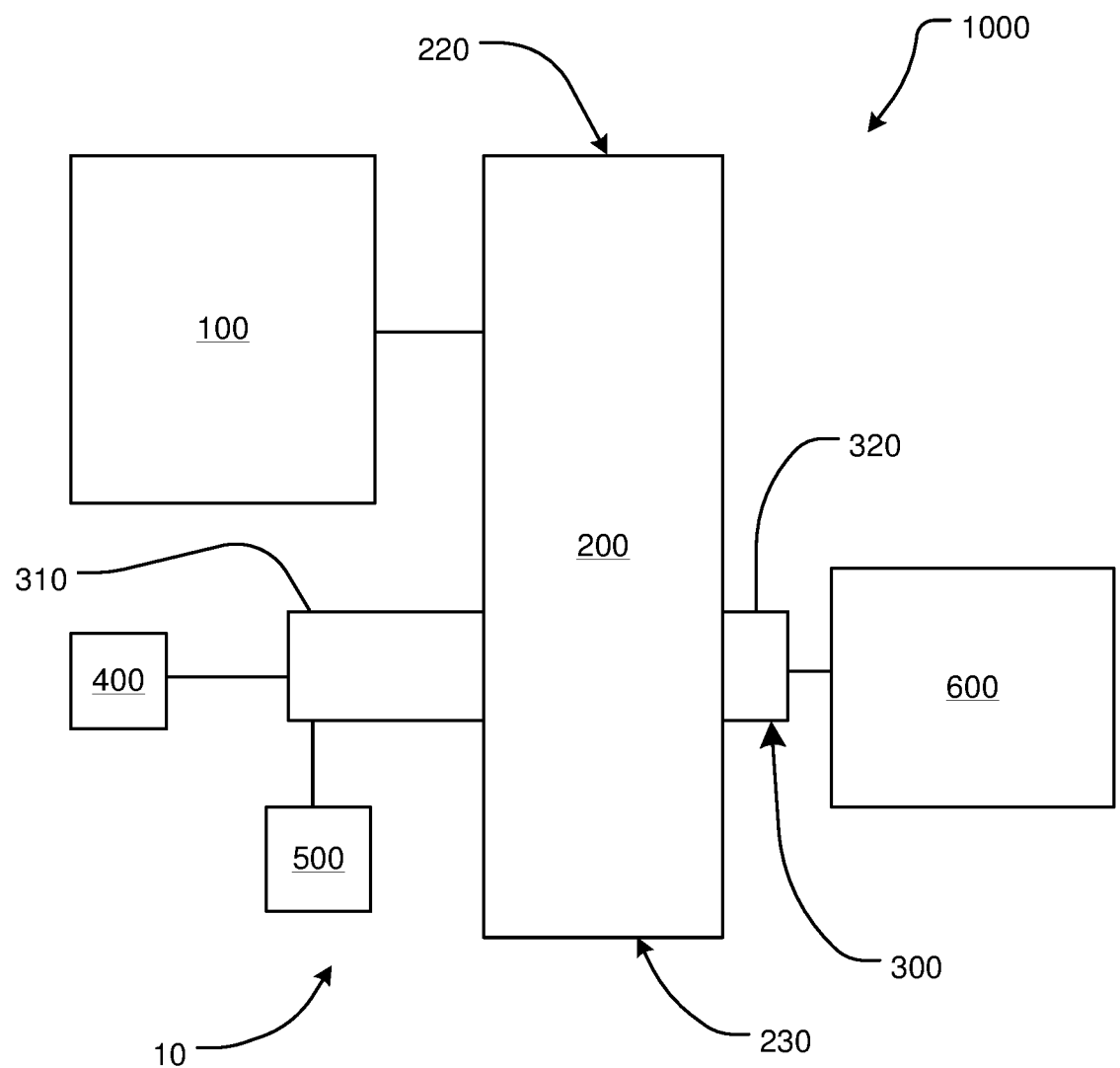
FIG. 1 is a block diagram of a microwave plasma generation system, according to some embodiments.

This disclosure generally relates to microwave chambers, microwave plasma systems including such microwave chambers and methods for generating and sustaining plasma using microwave energy in such microwave chambers and microwave plasma systems. Some embodiments relate to such microwave chambers, systems and methods for use in spectroscopy.

Plasmas are convenient for heating a chemical sample to a point where it is atomized, ionised and/or excited so as to emit light characteristic of each element present in the sample and to create ions of said elements. This light can then be analysed by a spectrometer to determine the concentration of each element present or the ions can be analysed in a mass spectrometer to determine the concentration of each element present. This is also known as spectro-chemical analysis and plasma may be used in spectroscopic systems such as atomic emission spectrometers, optical emission spectrometers and atomic mass spectrometers for spectro-chemical analysis.

Some embodiments relate to a microwave chamber for plasma generation, comprising a launch structure at a first end of the microwave chamber to accommodate a microwave source for producing microwave energy; a termination section at a second end of the microwave chamber opposite the first end, the termination section configured to substantially block propagation of the microwave energy from the second end of the chamber; and an internal wall structure for guiding the microwave energy received within the microwave chamber at the first end toward the second end, the internal wall structure defining a cavity and comprising an impedance matching section intermediate the first end and the second end; a capacitive loaded section intermediate the impedance matching section and the second end, wherein the capacitive loaded section comprises at least one ridge extending along a longitudinal axis of the chamber; and wherein the microwave chamber defines a first opening extending through a first wall of the capacitive loaded section and a second opening extending through a second wall of the capacitive loaded section, the second wall being opposite the first wall; and wherein the first opening and second opening are configured to cooperate with one another to receive a plasma torch in the capacitive loaded section along an axis extending through first opening and second opening and substantially perpendicular to the longitudinal axis of the chamber, wherein the capacitive loaded section comprises a substantially rectangular section comprising first and second major walls and first and second minor walls, the at least one ridge of the wall structure is disposed along at least one of the first and second major walls, and the first and second minor walls comprise the first and second opposite walls, respectively.

The at least one ridge may be disposed along a centreline of the chamber. The at least one ridge may comprise a first ridge projecting into the cavity and a second ridge projecting into the cavity, wherein the second ridge is opposite the first ridge.

The at least one ridge may extend along the capacitive loaded section and along at least part of the impedance matching section. For example, the at least one ridge may comprise a capacitive loaded section portion extending along a length of the capacitive loaded section. The at least one ridge may comprise a tapered portion extending along a length of the impedance matching section and tapering toward the launch structure. The tapered portion of the ridge may taper in at least one of height and width along its length.

In some embodiments, the impedance matching section may taper toward the capacitive loaded section to facilitate propagation of microwave energy received at the first end of the microwave chamber into the capacitive loaded section. In some embodiments, the impedance matching section may comprise at least one of a stub or post disposed within the cavity to allow the impedance of the cavity in the impedance matching section to be selectively adjusted.

The at least one ridge may comprise a capacitive loaded section portion and the capacitive loaded section portion of the ridge may define a recess for receiving at least a portion of the plasma torch and wherein the first and second openings cooperate with the recess to accommodate the plasma torch. The recess may be shaped to compensate for asymmetric electric field strength across the recess. For example, the recess may be shaped to have a rotational asymmetry about the axis extending through the first and second openings. The recess may define at least a part of a rounded shape with having a central axis that is substantially parallel and offset from the axis that extends through the first and second openings.

In some embodiments, the at least one ridge may comprise a first ridge projecting into the cavity and including a first capacitive loaded section portion extending along a length of the capacitive loaded section and a second ridge projecting into the cavity and including a second capacitive loaded section portion extending along a length of the capacitive loaded section, wherein the first capacitive loaded section portion is opposite the second capacitive loaded section portion, wherein the first capacitive loaded section portion defines a first recess and the second capacitive loaded section portion defines a second recess and wherein the first and second recesses cooperate with the first and second openings to receive the plasma torch. For example, the first and second recesses may cooperate with one another to define a shape in the form of a circle, a polygon, an arch, a blunt triangle and a combination of a semicircle or a rectangle.

The microwave chamber may comprise a viewing port disposed in the termination section and wherein the termination section may be further configured to allow passage of visible and ultraviolet light through the viewing port. In some embodiments, the viewing port may span only a portion of the cavity to allow for side-on viewing of a portion of the plasma torch extending between the first and second openings and the termination section comprises a substantially C-shaped cross-sectional profile.

The microwave chamber may further comprise a plasma torch extending between the first opening and the second opening.

Some embodiments relate to a microwave chamber for plasma generation, comprising: a launch structure at a first end of the microwave chamber to accommodate a microwave source for producing microwave energy; a termination section at a second end of the microwave chamber opposite the first end, the termination section configured to substantially block propagation of the microwave energy from the second end of the chamber; and an internal wall structure for guiding the microwave energy received within the microwave chamber at the first end toward the second end, the internal wall structure defining a cavity and comprising: an impedance matching section intermediate the first end and the second end; a capacitive loaded section intermediate the impedance matching section and the second end, wherein the capacitive loaded section comprises at least one ridge extending along a longitudinal axis of the chamber; and wherein the microwave chamber defines a first opening extending through a first wall of the capacitive loaded section and a second opening extending through a second wall of the capacitive loaded section, the second wall being opposite the first wall; wherein the first opening and second opening are configured to cooperate with one another to receive a plasma torch in the capacitive loaded section along an axis extending through first opening and second opening and substantially perpendicular to the longitudinal axis of the chamber; and wherein the impedance matching section tapers toward the capacitive loaded section to facilitate propagation of microwave energy received at the first end of the microwave chamber into the capacitive loaded section.

In some embodiments, the capacitive loaded section comprises a substantially rectangular section comprising first and second major walls and first and second minor walls, the at least one ridge of the wall structure is disposed along at least one of the first and second major walls, and the first and second minor walls comprise the first and second opposite walls, respectively.

Some embodiments relate to a method for microwave-stimulated plasma generation in a microwave chamber, the method comprising locating a plasma torch comprising a plasma forming gas in a substantially rectangular capacitively loaded section of a microwave chamber such that it extends across a width of a cavity of the chamber and is received by cooperating first and second openings disposed in first and second opposite minor walls, respectively, of the substantially rectangular capacitively loaded section along an axis substantially perpendicular to a longitudinal axis of the chamber, and wherein the capacitively loaded section comprises one or more ridges extending along the longitudinal axis; delivering microwave energy to a first end of the chamber; and propagating microwave energy in the microwave chamber from the first end to the capacitive loaded section and the plasma torch to generate and sustain a plasma in the plasma torch.

The method may further comprise substantially preventing propagation of microwave energy through a second end of the microwave chamber while allowing passage of visible and ultraviolet light through an end aperture disposed at the second end.

In some embodiments, locating the plasma torch in the capacitively loaded section comprises disposing at least a portion of the plasma torch between the one or more ridges in the capacitive loaded section and a wall of the capacitive loaded section. In some embodiments, locating the plasma torch in the capacitively loaded section comprises disposing at least a portion of the plasma torch within a recess defined by one or more ridges. In some embodiments, locating the plasma torch in the capacitively loaded section comprises locating the plasma torch within the capacitive loaded section such that an end of an inner tube of the plasma torch is located substantially between a wall of the capacitive loaded section and the one or more ridges.

Some embodiments relate to a method for microwave-stimulated plasma generation in a microwave chamber as described above, the method comprising locating a plasma torch comprising a plasma forming gas in a capacitively loaded section of the microwave chamber such that it extends across a width of a cavity of the chamber, along an axis substantially perpendicular to the longitudinal axis of the chamber; delivering microwave energy to a first end of the chamber; and propagating microwave energy in the microwave chamber from the first end to the capacitive loaded section and the plasma torch to generate and sustain a plasma in the plasma torch.

Referring now to FIG. 1, there is illustrated a block diagram of a spectroscopic system 1000 including a plasma generating system, generally indicated at 10, which may be employed in spectroscopy to produce a plasma from a plasma forming gas (such as nitrogen) that absorbs microwave energy. The plasma generating system 10 includes a microwave source 100 (such as a magnetron) coupled to a microwave chamber 200, such as an electromagnetic waveguide. The microwave chamber 200 facilitates the propagation of microwaves received from the microwave source 100 at a first end 220 of the microwave chamber 200 toward a second end 230 of the microwave chamber 200, opposite to the first end 220.

The microwave chamber 200 is configured to receive a plasma torch 300 at a location between the first end 220 and the second end 230. The plasma torch 300 comprises a receiving end 310 (at an upstream end of the plasma torch) and a downstream end 320 which is opposite the receiving end 310. The plasma torch 300 may be elongated and extend through and span a width of the microwave chamber 200 and at least part of the downstream end 320 of the plasma torch 300 may project out from the microwave chamber 200. The receiving end 310 of the plasma torch 300 is arranged to receive a plasma forming gas from a gas source 400 and a carrier gas containing a sample from a sample source 500. Energy is coupled into a plasma forming gas in the plasma torch to sustain a plasma from microwaves in the microwave chamber 200.

A spectrometer 600 may be coupled to the plasma torch 300 at or near the downstream end 320. If the plasma generating system 10 forms part of an atomic emission spectrometer or optical emission spectrometer, the plasma torch 300 is coupled to an optical spectrometer such that the optical spectrometer receives emitted light from the sample constituents of the atomized sample within the plasma torch 300. If the plasma generating system 10 is used for mass spectroscopy, the plasma torch 300 is coupled to a mass spectrometer such that the mass spectrometer can analyse the ionised constituents of the atomized sample from the plasma torch.

In use of the system 10, the plasma forming gas, carrier gas and the sample travel from the receiving end 310 of the plasma torch 300 towards the downstream end 320. Microwaves guided from the microwave source 100 to the plasma torch 300 by the microwave chamber 200 interact with the plasma forming gas within the plasma torch 300 and thereby allow microwave energy to be absorbed by the plasma forming gas to produce a plasma. The plasma is formed from the plasma forming gas at an initiation portion 315 (see FIGS. 4b and 5e) within the plasma torch where most of the energy from the microwaves are absorbed by the plasma forming gas to create a plasma. The plasma heats and excites the sample accordingly.

Figure 2:
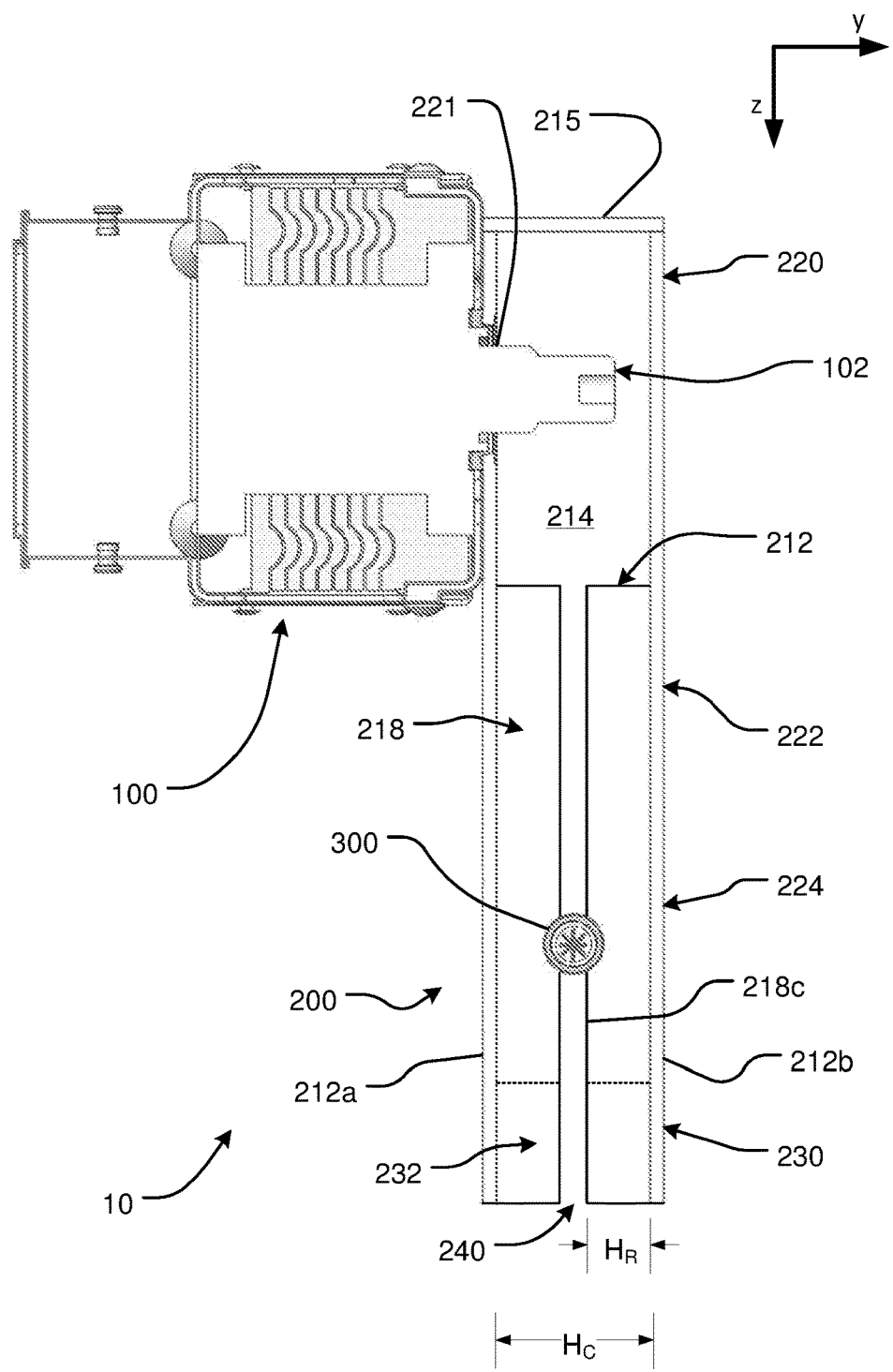
FIG. 2 is a schematic diagram of the microwave plasma generation system of FIG. 1.

Referring now to FIG. 2, there is shown a schematic view of the plasma generating system 10 including the microwave chamber 200, which is configured to support a desired microwave propagation mode at a frequency suitable for generating and sustaining a plasma, according to some embodiments.

The microwave chamber 200 comprises an internal wall structure 212 forming or defining a cavity 214. The internal wall structure 212 is configured to guide microwave energy emitted from the microwave source 100, and received at the first end 220 of the microwave chamber 200, through the cavity 214 toward the second end 230 of the microwave chamber 200. In some embodiments, the microwave chamber 200, and in particular, the internal wall structure 212 of the microwave chamber 200, may be designed to optimise electro-magnetic fields of the microwave to produce desired properties (such as shape or position) of the plasma formed within the plasma torch 300, as discussed in more detail below.

Figures 3A, 3B:
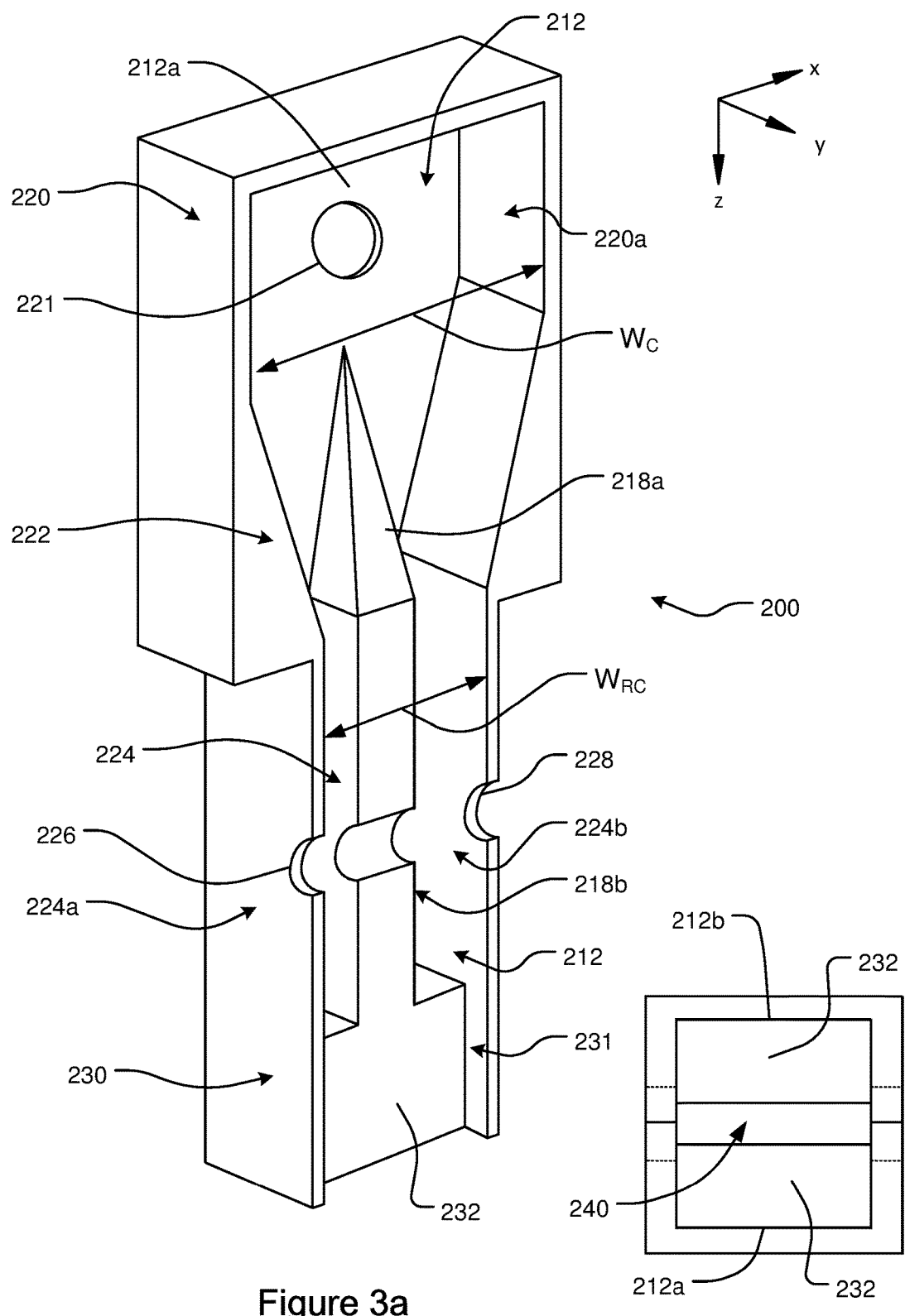

As depicted in FIGS. 2 and 3a, the microwave chamber 200 may be a substantially elongate waveguide having a longitudinal axis (the z-axis shown in FIG. 3a) extending between the first end 220 and the second end 230, a transverse axis (x) extending perpendicular to the longitudinal axis and substantially parallel with a transverse width ($W_C$) of the cavity 214, being the widest internal dimension of a cross section of the chamber, and a transverse axis (y) extending perpendicular to the longitudinal axis and to the transverse axis (x), substantially parallel with a transverse height ($H_C$) of the cavity 214, being the narrowest internal dimension of a cross section of the chamber 200.

In some embodiments, the first end 220 may include a first end section 220a of the internal wall structure 212 with a cross-section in the transverse (x-y) plane that may be substantially rectangular in shape. The first end section 220a may have a largest transverse cavity width ($W_C$) greater than the largest transverse cavity height ($H_C$). This may enable the waveguide to operate in the $TE_{01}$ mode. The cavity dimensions suitable for propagation of microwaves received from the microwave source 100 may depend on the frequency of the microwaves. In an exemplary embodiment where 2.45 GHz microwaves are to be propagated through the microwave chamber 200, a theoretical minimum transverse cavity width $W_C$ of the first end section 220a is approximately 61 mm. In some embodiments, the transverse cavity width of the first end section 220a may be in approximately the range of 70 mm to 86 mm. In some embodiments, the first end section 220a of microwave chamber 200 may have the dimensions of a WR340 rectangular waveguide according to the US Electronics Industries Alliance (EIA) standards. In some embodiments, the first end section 220a of microwave chamber 200 may have a transverse cavity width ($W_C$) of 86 mm and a transverse cavity height ($H_C$) of 34 mm.

Referring again to FIG. 2, the first end 220 of the microwave chamber 200 may define an opening 221 to accommodate or receive a microwave antenna 102 coupled to the microwave source 100 and configured to transmit or deliver microwaves from the microwave source 100 into the cavity 214. In some embodiments, the first end 220 of the microwave chamber 200 comprises a conducting wall 215 which acts as a short circuit to mitigate, prevent or block the passage of microwave radiation from the cavity 214 and reflect microwave radiation towards the second end 230. In some embodiments, the first end 220 may comprise a microwave launch structure to allow coupling of a magnetron (not shown) to a microwave chamber 200.

In some embodiments, the second end 230 includes a second end section 231 of the internal wall structure 212, for example, as shown in FIGS. 3a and 3b. In some embodiments, the second end 230 may comprise a termination section or microwave cut-off structure 232 to substantially mitigate, prevent or block propagation of the microwave energy out of cavity 214 from the second end 230 by shaping the electromagnetic fields within the second end 230. For example, the microwave cut-off structure 232 may prevent dangerous or undesirable leakage of microwave energy out of the internal wall structure 212.

In some embodiments, the microwave cut-off structure 232 may span the cavity width of the second end section 231 of the internal wall structure 212. In some embodiments, the microwave cut-off structure 232 may comprise a sheet of conductive material that spans the cavity width and height of the second end section 231, and the sheet defines a plurality of holes to form a mesh structure (not shown).

In some embodiments, as shown in FIGS. 2 and 3b, the second end 230 of the microwave chamber 200 may define an end aperture or viewing port 240 to allow visual and/or device-based observation of the plasma formed in the cavity 214 from outside the microwave chamber 200. The cut-off structure 232 may allow passage of visible and ultraviolet light through the end aperture 240, for example, light with wavelengths between 160 and 3000 nanometers. In some embodiments, the end aperture 240 may extend through the microwave cut-off structure 232 and optical light (for example, light spanning the far infrared to ultraviolet spectrum) from the plasma can escape through the microwave cut-off structure 232 and from the end aperture 240 thereby allowing an operator of the spectrometer to visually observe the plasma within the plasma torch 300 in safety. Alternatively or in addition, a photodetector or camera can be used to observe the plasma through the end aperture 240.

As the microwave chamber 200 is formed from a conductive material the microwave chamber 200 is typically not optically transparent. For example, in some embodiments, the microwave chamber 200 is formed from aluminium, copper, or brass. The provision of end aperture 240 may thereby allow the plasma to be viewed from a direction other than from the axial direction along the length of the plasma torch (e.g. the downstream end). This may enable the plasma to be observed or monitored for spectroscopic analysis of plasma emission as well as simple visual checking of plasma shape and form for problem shooting or optimisation of the plasma. As discussed above, the initiation portion 315 is a location where a plasma is initially formed inside the plasma torch 300. In some embodiments, the end aperture 240 is shaped or located such that the initiation portion 315 is observable from outside the microwave chamber 200.

In some embodiments, the end aperture 240 may extend along a majority of the width of the cavity 214 defined by the second end section 231 at the second end 230 to provide for improved safe observation of the plasma. For example, the end aperture 240 may span at least a portion of, or the majority of the cavity 214 to allow for side-on viewing of a plasma torch 300 received by the chamber 300. This may be valuable for spectroscopic analysis of plasma emission as well as simple visual checking of plasma shape and form. In other embodiments, the end aperture 240 may define a rounded shape.

In some embodiments, the microwave cut-off structure 232 may be an approximation for or act as a short circuit behaving as a reduced-height rectangular waveguide operating far beyond cut-off. Microwaves therefore cannot propagate past the microwave cut-off structure 232 and there may only be an evanescent wave produced in the cut-off structure 232 which will decay exponentially along the longitudinal axis. Accordingly, if the length of the cut-off structure 232 is made long enough, the evanescent wave will have decayed to the point where there will be an acceptably low level of energy leakage to the environment external to the microwave chamber 200 and such a microwave cut-off structure 232 may safely allow a side view of the plasma within the cavity 214 through the end aperture 240. Adjusting the length of the microwave cut-off structure 232 allows a rate of exponential decay of the evanescent wave to be adjusted while maintaining observability of the plasma.

The microwave cut-off structure 232 may have a fixed shape or may be adjustable in longitudinal length to allow continuous or periodic adjustment of the structure 232 to enable impedance matching to accommodate changes in plasma conditions. The distance between the edge of the cut-off structure 232 nearest to the first end 220 and the plasma torch 300 may therefore be adjusted. For example, the microwave cut-off structure 232 may comprise a sliding short to allow the microwave cut-off structure 232 to act as a tuning adjustment. Selective tuning of the cut-off structure 232 may enable optimisation of the performance of the microwave chamber 200 as a plasma generator.

Figure 4A:
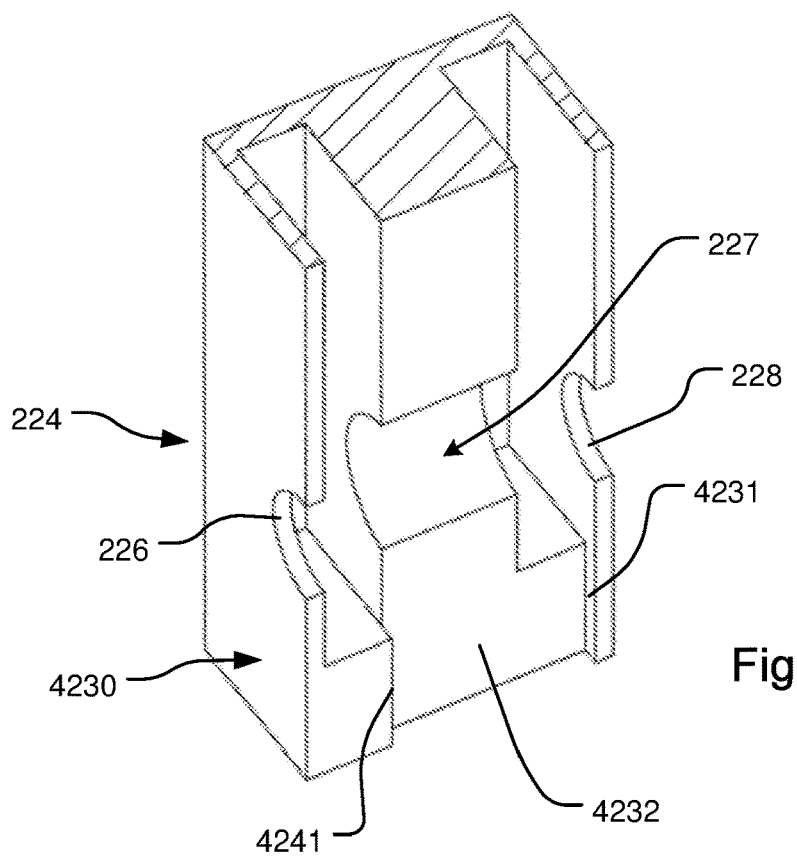
FIG. 4a is a partial section perspective view of a microwave chamber, according to some embodiments.
Figure 4B:
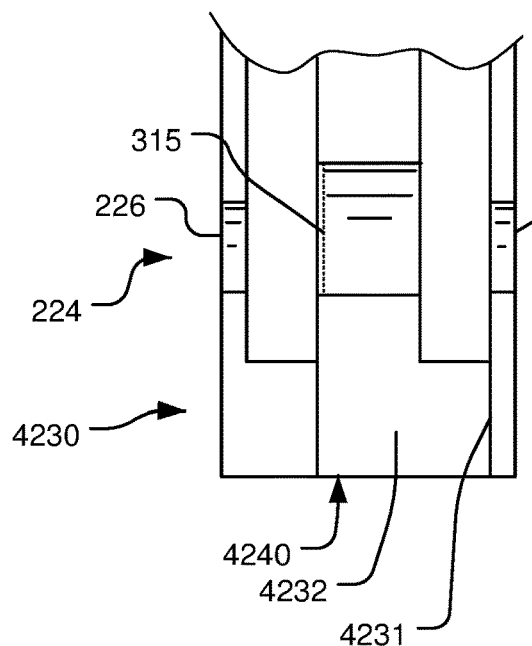
Figure 4C:
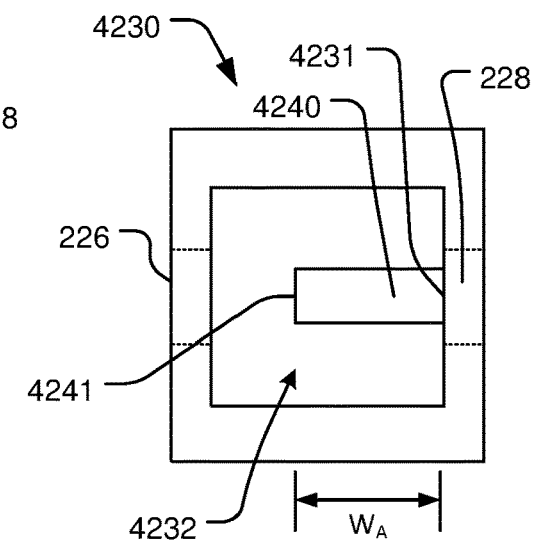
FIG. 4c is an end view of a the microwave chamber shown in FIGS. 4a and 4b.

In some embodiments, as opposed to the second end 230 comprising the microwave cut-off structure 232 and end aperture 240 of FIGS. 2, 3a and 3b, the chamber 300 may comprises a second end 4230 comprising a microwave cut-off structure 4232 and end aperture 4240 as illustrated in FIGS. 4a, 4b and 4c. Similar to end aperture 240, the end aperture 4240 extends through the microwave cut-off structure 4232 along the longitudinal axis of the chamber 300 to allow optical light from the plasma to escape from the cavity 214 through the end aperture 4240. However, the end aperture 4240 spans only a portion of the width of the cavity 214 along the transverse x-axis of the chamber, substantially parallel to an axis along which a plasma torch 300 is received. For example, the aperture 4240 may extend from the second end section 4231 to a wall 4241 of the microwave cut-off structure 4232 and the microwave cut-off structure 4232 may have a substantially C-shaped cross-sectional profile. In some embodiments, the end aperture 4240 is configured to allow for viewing of only a plasma of a plasma torch 300 received by the chamber 200 and the microwave cut-off structure 4232 obstructs a view (from outside of the microwave chamber 200) of a portion of the plasma torch 300, for example, a portion of the plasma torch 300 upstream from the initiation portion 315 where a plasma would not be present.

By providing the chamber 300 with the second end 4230 which includes the microwave cut-off structure 4232 defining the end aperture 4240 that spans only a portion of the cavity, (for example, an end aperture 4240 having a smaller width $W_A$ than the cavity width $W_C$), a more rapid attenuation of the evanescent wave created in the cut-off structure 4232 is achieved. As a result, the microwave cut-off structure 4232 used may be shorter along the longitudinal z-axis than the microwave cut-off structure 232 where the end aperture 240 spans the entire cavity width $W_C$.

Referring again to FIG. 3a, the internal wall structure 212 of the microwave chamber 200 may comprise the first end section 220a, an impedance matching section (or transition section) 222 intermediate the first end section 220a and the second end section 231, and a capacitive loaded section 224 intermediate the impedance matching section 222 and the second end section 231.

The capacitive loaded section 224 includes regions of the cavity 214 where the capacitance is different from other regions in the cavity and where the electric field strength of the microwaves in those regions is increased. The capacitive loaded section 224 is configured to facilitate propagation of the microwave energy, received from the impedance matching section 222, through the capacitive loaded section 224 and to a plasma torch 300 received by the capacitive loaded section 224. In some embodiments, the capacitive loaded section 224 may comprise a ridged waveguide or a double ridged waveguide. For example, the capacitive loaded section 224 may comprise one or more ridges 218 extending along a longitudinal axis of the chamber 200, as discussed in more detail below. For example, the one or more ridges 218 may be composed or a metal or a dielectric material.

As illustrated in FIGS. 2, 3a and 3b, the capacitive loaded section 224 of the microwave chamber 200 defines a first opening 226 configured to receive a portion of the plasma torch 300, and defines a second opening 228 configured to receive a portion of the plasma torch 300. The first opening 226 extends through a first wall 224a of the capacitive loaded section 224 into the cavity 214 and the second opening 228 extends through a second wall 224b of the capacitive loaded section 224 into the cavity 214, the second wall 224b being opposite to the first wall 224a. In some embodiments, the second opening 228 allows a portion of the plasma torch to protrude through the second opening 228 and out of the cavity 214. The first opening 226 and the second opening 228 are configured to cooperate with each other to receive the plasma torch 300 in the capacitive loaded section 224 along an axis extending through first opening 226 and second opening 228 and substantially perpendicular to the longitudinal axis of the chamber 200. The first opening 226 and the second opening 228 are configured to receive the plasma torch 300 such that it extends across and spans the cavity width of the capacitive loaded structure 224. For example, the first and second openings 226, 228 may be aligned or in register with one another and allow the capacitive loaded section 224 to receive the plasma torch 300 in a configuration where the length of the plasma torch 300 is substantially transverse to a direction of propagation of microwave energy to be guided by the microwave chamber 200.

In some embodiments, the capacitive loaded section 224 is substantially rectangular comprising first and second major walls and first and second minor walls and the first and second walls 224a, 224b correspond with the first and second minor walls and the walls 212a, 212b of the internal wall structure 212 comprise the first and second major walls, respectively, of the capacitive loaded section 224 along which the capacitive loaded section portion 218a of the at least one ridge 218 is disposed.

In existing commercial microwave plasma sources, a waveguide is restricted to having a cavity width of at least 0.5 times the microwave wavelength in order to propagate microwave energy. For a conventional rectangular waveguide at microwave frequencies around 2.455 GHz, the minimum (internal) waveguide cavity width is limited to being more than 61 mm wide. For example, the WR340 conventional rectangular waveguide recommended for 2.455 GHz microwave propagation has a cavity width of 86.4 mm (3.4 inches). The one or more ridges 218 of the internal wall structure 212 of the chamber 200 are configured to shape the electromagnetic fields of the microwaves in the cavity 214 to thereby enable propagation of microwaves of a specific frequency within a microwave chamber 200 having a cavity width smaller than the cavity width of a conventional rectangular waveguide suitable for propagation of that specific frequency. Thus, by providing the capacitive loaded section 224 with the one or more ridges 218, the cavity width in the capacitive loaded section 224 (capacitive loaded section cavity width, $W_{RC}$) can be reduced while still the allowing propagation of microwaves at the specific frequency. The inclusion of one or more ridges 218 in the capacitive loaded section 224 reduces the cut-off frequency of the capacitive loaded section 224.

Having a reduced cavity width in the capacitive loaded section 224 means that the spectrometer 600 may be coupled to the plasma torch 300 such that a distance between the spectrometer 600 and the initiation portion 315 is reduced. This may provide for more effective elemental analysis. For example, as the plasma and sample within a plasma torch 300 flow over a distance from the initiation portion 315 to the downstream end 320 of the torch 300, the plasma and sample cool considerably causing many of the ions formed to decay back to the atomic state and many of the excited neutral atoms to decay back to the ground state causing self-absorption. Accordingly, for optical analysis, the observed light emanating from the hot regions of the plasma passes through a cloud of unexcited atoms before it can be detected. During this passage some of the light can be reabsorbed by the unexcited atoms reducing the intensity of the light received. In such cases, there may be a resultant reduction in sensitivity of the spectrometer 600 to chemicals in the sample and a departure from the linear relationship between intensity of light received and concentration of elements present in the sample. In the case of a mass analysis, a significant fraction of the ions to be collected may have decayed back to neutral atoms or may have combined with other elements such as oxygen to form charged compounds which complicates analysis of the measured mass spectrum. However, as the cavity width ($W_{RC}$) of the capacitive loaded section 224 of the chamber 200 is less than a conventional waveguide width, there is a resultant shorter distance between the initiation point 310 and the downstream end 320 of the plasma torch 300 to which the spectrometer 600 may be coupled. As a result, the plasma and sample do not cool as much over this shorter distance compared to plasmas formed in conventional rectangular microwave waveguides cavities, thereby allowing for improved elemental analysis.

Plasma in the plasma torch 300 typically has a significantly lower impedance for microwaves than a conventional rectangular waveguide. As the cavity width ($W_{RC}$) of the capacitive loaded section 224 is less than that the cavity width of conventional waveguides for a specific frequency of microwaves, the capacitive loaded section 224 also has a lower impedance for microwaves than a conventional rectangular waveguide. Therefore, locating the plasma torch 300 in the capacitive loaded section 224 yields a closer match between the microwave impedance in the plasma and the microwave impedance in the cavity 214 and improves the coupling between microwaves and the plasma. Due to the closer impedance match, more of the microwave energy is absorbed by the plasma and less microwave energy is reflected by the plasma. In some embodiments, the capacitive loaded section 224 may negate a need for an iris structure, thereby simplifying the construction of plasma generating systems 10.

In some embodiments, a further improved impedance match may be achieved by positioning the plasma torch 300 relatively close to the microwave cut-off structure 232 which acts as a short circuit at the second end 230 of the microwave chamber 200 at the second end 230. In some embodiments, the ratio of the electric to magnetic field intensity can be controlled by adjusting the positioning the plasma torch 300 relative to the microwave cut-off structure 232. The microwave cut-off structure 232 has a zero impedance point at the short circuit (zero electric field and maximal magnetic field aligned along the width of the guide) and the impedance progressively rises from the second end 230 toward the first end 220, increasing electric field E and decreasing magnetic field H. As discussed above, the microwave cut-off structure 232 may be adjustable, allowing for selection of a distance between the location in the capacitive loaded section 224 for receiving the plasma torch to thereby match the local impedance at the torch location to the plasma impedance. This distance is relatively small, for example between 1 and 30 mm. Such an arrangement has the advantage that the plasma is so close to the short circuit that the magnetic field component is essentially axially aligned with the central transverse axis of the plasma torch 300 and hence axial with respect to the plasma. An axial magnetic field (aligned along the x-axis), either alone or in combination with a transverse electric field, is highly desirable in forming a plasma of the right shape for acting as an emission and ion source for spectroscopy.

In some embodiments, the cavity width ($W_{RC}$) of the capacitive loaded section 224 is less than the cavity width ($W_C$) in the first end section 220a. For example, the cavity width ($W_{RC}$) of the capacitive loaded section 224 may be smaller than the cavity width ($W_C$) in the first end section 220a by a factor of 2.5 or more. If the first end section 220a has a greater cavity width than that of the capacitive loaded section 224, it will also have a greater microwave impedance. A discontinuity in the impedance between a region of large impedance and lower impedance may lead to microwave reflectance at the discontinuity. The impedance matching section 222 is configured to facilitate propagation of microwave energy from the first end section 220a into the capacitive loaded section 224 by matching the impedance of the first end section 220a with the impedance of the capacitive loaded section 224. In this way, reflected power may be reduced and power transfer may be improved, and in some cases, optimised.

In some embodiments, the impedance matching section 222 may be configured such that the cavity width ($W_C$) of the internal wall structure 212 is progressively reduced towards the capacitive loaded section 224 along the longitudinal axis of the chamber 200. The cavity width ($W_C$) may therefore be reduced from the transverse cavity width in the first end section 220a to the transverse cavity width ($W_{RC}$) in the capacitive loaded section 224. For example, the impedance matching section 222 may be substantially inwardly tapered from the first end section 220a toward the capacitive loaded section 224 such that the transverse cavity width ($W_C$) is linearly reduced towards the capacitive loaded section 224 along the longitudinal axis of the chamber 200. In some embodiments, the impedance matching section 222 may be substantially rectangular in shape at least one of the minor walls of the impedance matching section 222 may taper along the longitudinal axis of the chamber 200 toward the capacitive loaded section 224. For example, in some embodiments, the impedance matching section 222 may only have one of the minor walls of impedance matching section 222 being inclined or tapering to reduce the cavity width ($W_C$) and the opposite minor wall of the impedance matching section 222 may be substantially straight or planar and form a substantially continuous wall with the adjacent wall of the capacitive loaded section 224.

In some embodiments, a length of the impedance matching section 222 extending along the longitudinal axis of the chamber may be around 80 mm to 100 mm, for a microwave wavelength of about 200 mm to achieve suitable coupling between the first end section 220a and the capacitive loaded section 224.

In some embodiments, the impedance matching section 222 may comprise a microwave impedance transformer (not shown) such as a quarter wave impedance transformer to match the impedance of the first end section 220a with the impedance of the capacitive loaded section 224. In some embodiments, the impedance matching section 222 may comprise a stub or post (not shown) disposed within the cavity 214 to allow the impedance of the cavity 214 in the section impedance matching section 222 to be selectively adjusted.

As shown in the Figures, the height ($H_C$) of cavity 214 is substantially uniform throughout the microwave chamber 200 between the first end 220 and the second end 230 (including the impedance matching section 222 and the capacitive loaded section 224). However, it will be appreciated that in some embodiments, the cavity height $H_C$ may vary between the first end 220 and the second end 230. In some embodiments, the cavity height $H_C$ may be approximately half of the cavity width $W_C$ in the first end 220 of the chamber 200.

As discussed above, the one or more ridges 218 extend along the longitudinal axis of the microwave chamber 200 and within the cavity 214 and capacitively load a region of the cavity 214 near the ridges 218 thereby increasing the electric fields of the microwaves in those regions.

Figure 5A:
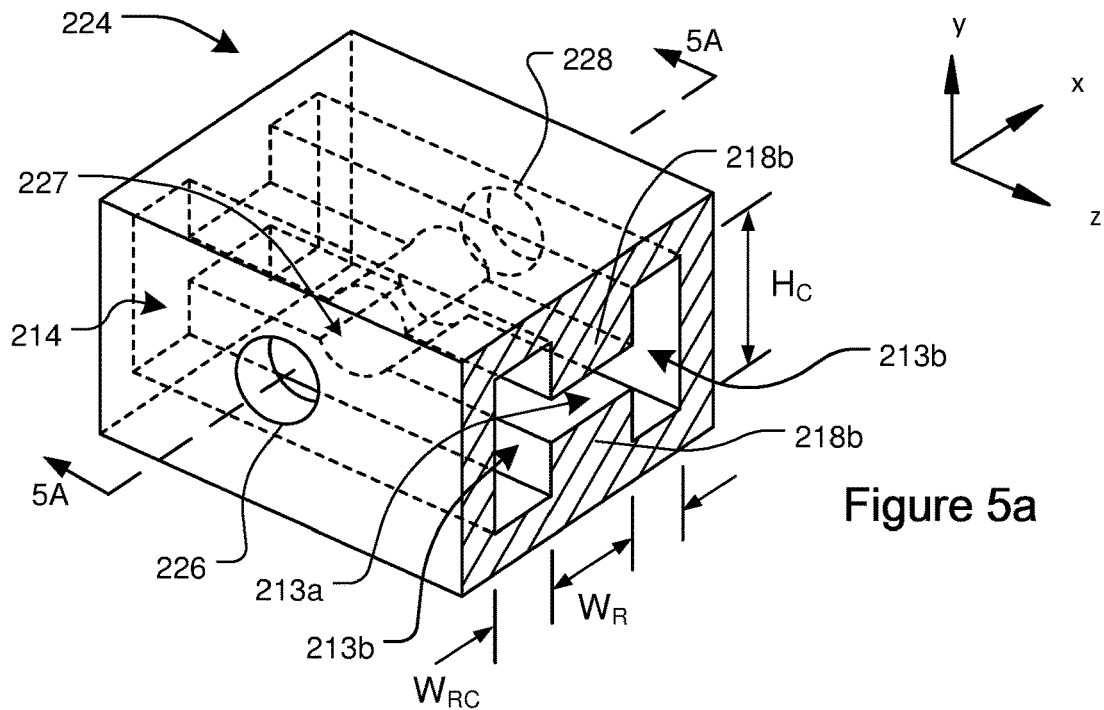
FIG. 5a is an isometric view of a capacitive loaded section of the microwave chamber of FIGS. 3a and 3b.
Figure 5B:
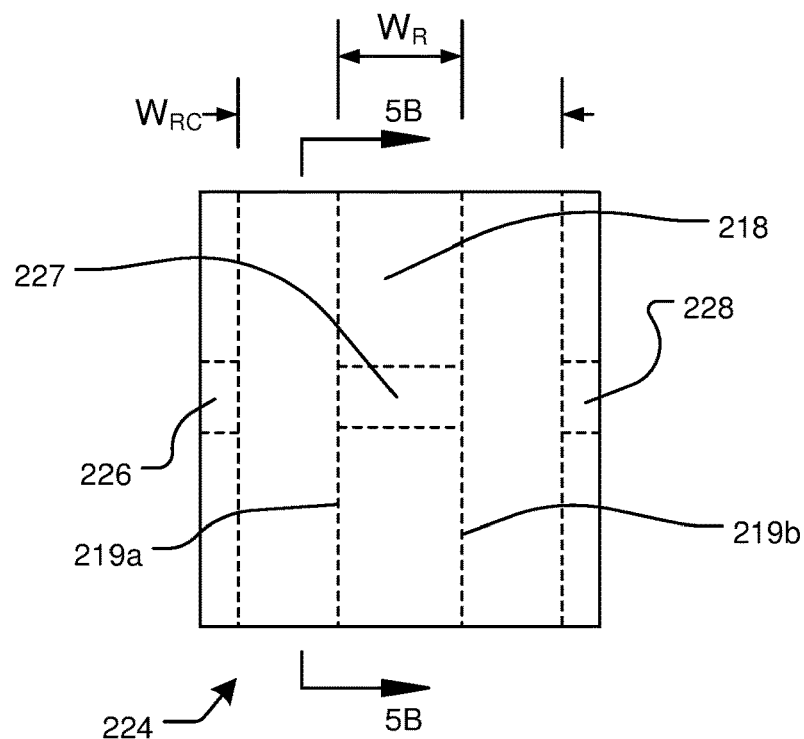

Referring now to FIGS. 3a, 5a and 5b, the one or more ridges 218 may each extend into the cavity 214 from a respective wall of the internal wall structure 212 of the microwave chamber 200 and may extend along a centreline of the microwave chamber 200. The one or more ridges 218 may have a ridge height in a transverse direction ($H_R$), ridge width ($W_R$) along another transverse axis and a ridge length ($L_R$) along the longitudinal axis of the chamber 200. The height of the ridges ($H_R$) may be defined by the largest perpendicular separation between the ridge surface 218c and the respective wall 212a, 212b from which it extends.

In some embodiments, the microwave chamber 200 may comprise a double ridged waveguide. For example, two ridges 218 may protrude from two opposing walls 212a and 212b of the internal wall structure 212. For example, a first ridge 218 may protrude from the first wall 212a of the internal wall structure 212 and extend along the longitudinal axis of the chamber and a second ridge 218 opposing the first ridge 218 may protrude from the second wall 212b of the internal wall structure 212 and extend along the longitudinal axis of the chamber 200. The height ($H_R$) of the first ridge 218 may be substantially equal to or different from the height ($H_R$) of the second ridge 218. Similarly, the length ($L_R$) of the first ridge 218 may be substantially equal to or different from the length ($L_R$) of the second ridge 218.

The one or more ridges 218 may extend along the length of the capacitive loaded section 224 and may extend along the entire length or at least a portion of the length of the impedance matching section 222. For example, as shown in FIG. 3a, the one or more ridges 218 may comprise a substantially tapered portion 218a and a capacitive loaded section portion 218b. For example, the impedance matching section 222 of the internal wall structure 212 may comprise the tapered portion 218a of the one or more ridges 218 and the capacitive loaded section 224 of the internal wall structure 212 may comprise the capacitive loaded section portion 218b. In some embodiments, the tapered portion 218a of the ridge 218 may extend along the entire length of the impedance matching section 222 and the capacitive loaded section portion 218b may extend along the entire length of the capacitive loaded section 224.

Referring again to FIG. 3a, as the cavity width ($W_C$) in the impedance matching section 222 decreases along the longitudinal axis of the chamber 200 towards the capacitive loaded section 224, the tapered ridge 218a of the impedance matching section 222 flares or tapers outwardly so that its width increases along the longitudinal axis of the chamber 200. In some embodiments, the ridge width ($W_R$) of the ridge 218 increases as it extends along the longitudinal axis of the chamber 200 from the impedance matching section 222 towards the capacitive loaded section 224. For example, the tapered ridge 218a may flare outwards to correspond with the width of the capacitive loaded section portion 218b in the capacitive loaded section 224. The tapered ridge 218a of the impedance matching section 222 also flares or tapers outwardly so that its height increases along the longitudinal axis of the chamber 200. In some embodiments, the ridge height ($H_R$) of the ridge 218 increases as it extends along the longitudinal axis of the chamber 200 from the impedance matching section 222 towards the capacitive loaded section 224. In some embodiments, the increasing dimensions of the tapered ridge 218a along the longitudinal axis of the chamber 200 allow microwaves from the first end section 220a to propagate through the impedance matching section 222 and into the capacitive loaded section 224 even though the cavity width ($W_C$) of the chamber 200 is reducing along the longitudinal axis of the chamber 200. Therefore, the impedance matching section 222 may facilitate propagation of microwave energy from the first end section 220a into the capacitive loaded section 224. By providing a tapered ridge 218a that flares or tapers outwardly so that its height and width increase along the longitudinal axis of the chamber 200, the creation of sparks due to electrical breakdown in air, which may result with an impedance matching section 22 having a tapered ridge 218a which tapers in width only, may be mitigated.

Figure 6A:
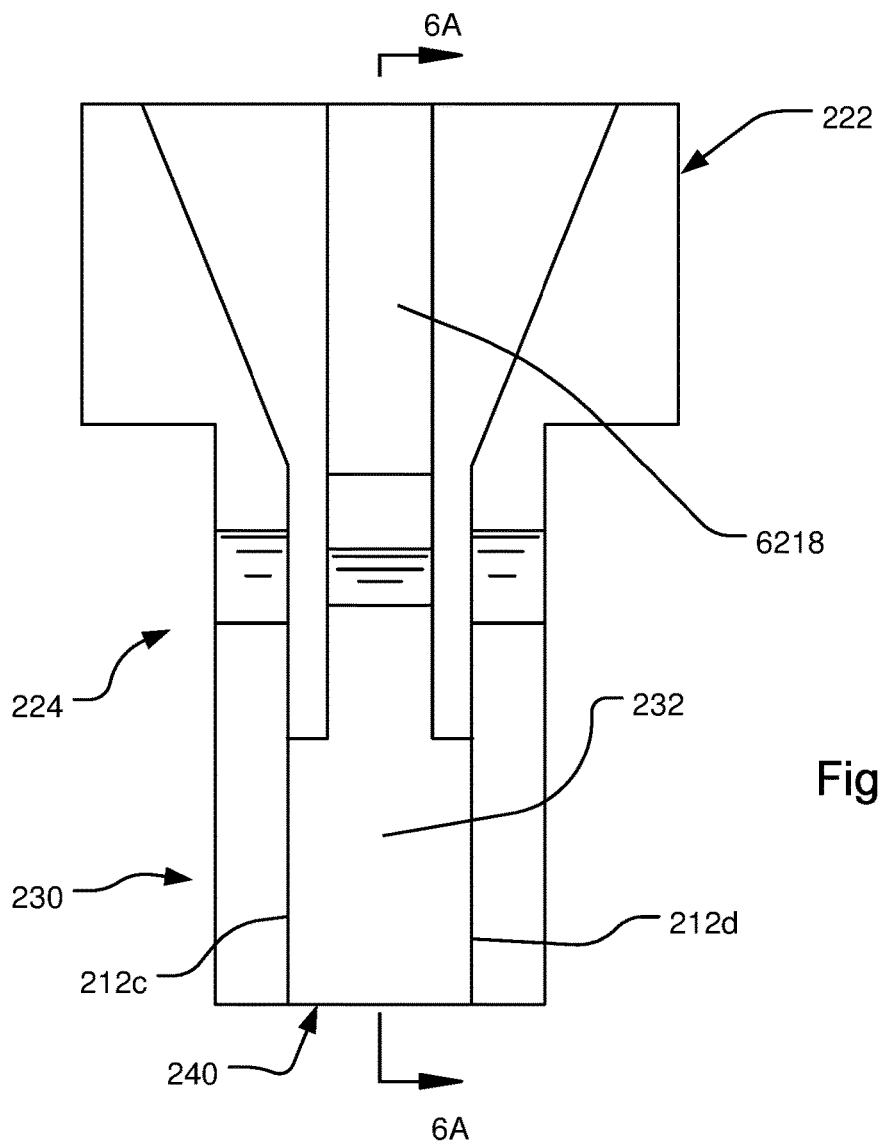
FIG. 6a is a cross-sectional view of a section of a microwave chamber according to some embodiments.
Figure 6B:
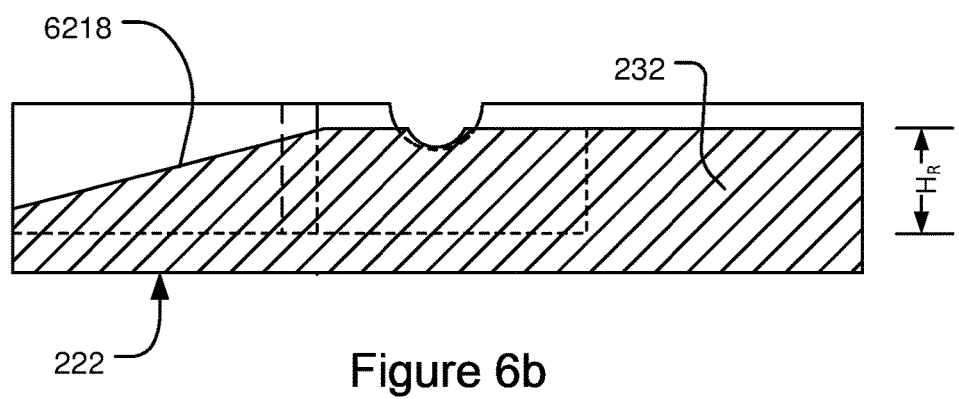
FIG. 6b is a cross-sectional view of the section of the microwave chamber of FIG. 6a taken along line 6A-6A.

In some embodiments, as opposed to the tapered ridge 218a which increases in both width and height along the longitudinal axis of the chamber 200, the one or more ridges 218 of the impedance matching section 222 of the internal wall structure 212 may comprise one or more tapered ridges 6218a that increase in height in height only, as illustrated in FIGS. 6a and 6b. The tapered ridges 6218a may increase in height (ridge height in the transverse y dimension) along the longitudinal axis of the chamber 300 but which maintain a substantially uniform width. The ridge height of the tapered ridges 6218a in the impedance matching section 222 may increase until it matches the ridge height ($H_R$) of the capacitive loaded section portion 218b in the capacitive loaded section 224. The increasing ridge height in the impedance matching section 222 may progressively change the impedance of the cavity 214 as described earlier and facilitate propagation of microwaves from the first end section 220a into the capacitive loaded section 224.

In other embodiments, the tapered ridge 218a may increase in both transverse ridge width ($W_R$) and transverse ridge height along the impedance matching section 222. In some embodiments, the one or more ridges 218 may have a polygonal cross-section or a cross-sectional shape where the side facing the centre of the cavity 214 has a curved shape. For example, the ridges 218 may have a transverse cross-section shaped as a square, rectangle, trapezoid or semi-circle.

Referring to FIGS. 5a to 5f, in some embodiments, the capacitive loaded section 224 comprises capacitive loaded section portions 218b of the ridges 218 substantially centrally located along the transverse x axis in the cavity 214, extending from first and second walls 212a, 212b of the internal wall structure 212 and extending along the longitudinal axis z of the chamber 200. As best shown in FIG. 5a, the cross-section of the capacitive loaded section 224 in the transverse (x-y) plane generally defines an area of the cavity 214 that has a H-shape and the capacitive loaded section portions 218b in the cavity 214 are separated by a gap 213a. Now also referring to FIG. 5b, the capacitive loaded section portions 218b of the ridges 218 comprise side walls 219a and 219b (in the y-z plane) and the side walls 219a, 219b along with the internal wall structure 212 also define cavity arms regions 213b on either side of the gap 213a separating the capacitive loaded section portions 218b.

In some embodiments, a dielectric material may be located in part of the gap 213a between the plasma torch 300 and the one or more ridges 218. In some embodiments, the height of the microwave cut-off structure 232 may substantially match the height of the ridge ($H_R$) and end aperture 240 defined by the microwave cut-off structure 232 may correspond in size to the gap 213a provided between the ridges 218.

Figure 5C:
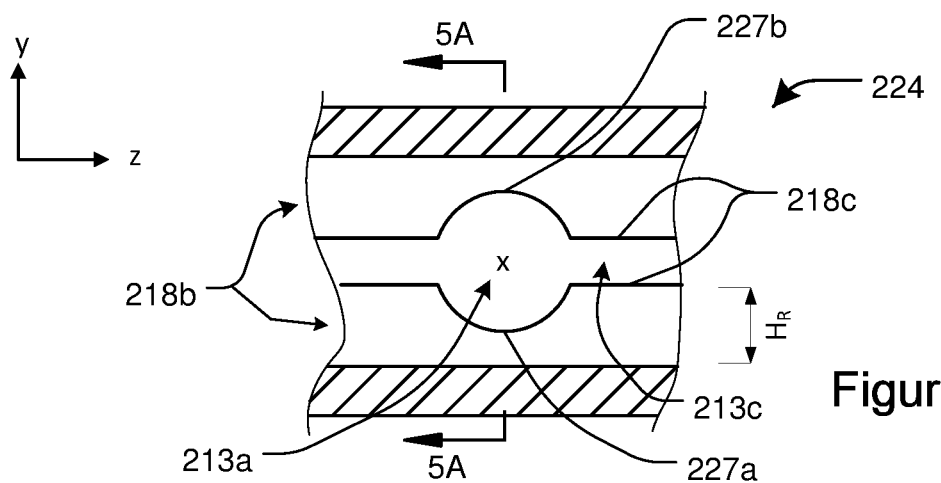
FIG. 5c is a cross-sectional view of the capacitive loaded section taken along line 5B-5B of FIG. 5b.

As shown in FIGS. 5a, 5b and 5c, in some embodiments, the capacitive loaded section portion 218b of the one or more ridges 218 defines a recess 227. The recess 227 may be configured to cooperate with the first and second openings 226, 228 to accommodate the plasma torch 300. For example, the recess 227 may be arranged to receive a length of the plasma torch 300. As shown in FIG. 5c, in some embodiments where two ridges 218b are provided, the first ridge protruding from the first major surface 212a defines a first recess 227a and the second ridge protruding from the second major surface 212b defines a second recess 227b. The first recess 227a and the second recess 227b may cooperate with one another to define at least a portion of the shape of a circle. In embodiments where there is a single ridge 218, the first and second opening 226 and 228 may be arranged such that at least part of the plasma torch 300 may be located between an opposing major surface 212b of the internal wall structure 212 opposite the ridge 218 and the recess 227 of the ridge 218.

The internal wall structure 212 creates a transverse magnetic field component (transverse to the longitudinal Z-axis) that is axially aligned with the x-axis and therefore with the plasma torch 300 and a transverse electric field component (transverse to the longitudinal Z-axis) aligned with the y-axis and therefore not aligned with the torch 300. Both the magnetic and electric fields, however, couple with the plasma within the torch 300 and transfer energy into the plasma.

Figure 5D:
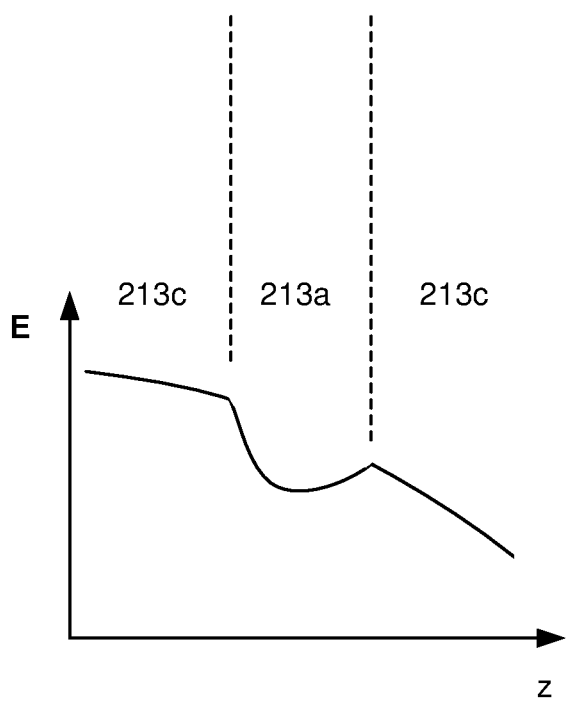
FIG. 5d is an illustrative plot of electric field strength of a microwave standing wave within the capacitive loaded section of FIGS. 5a to 5c.
Figures 5E, 5F:
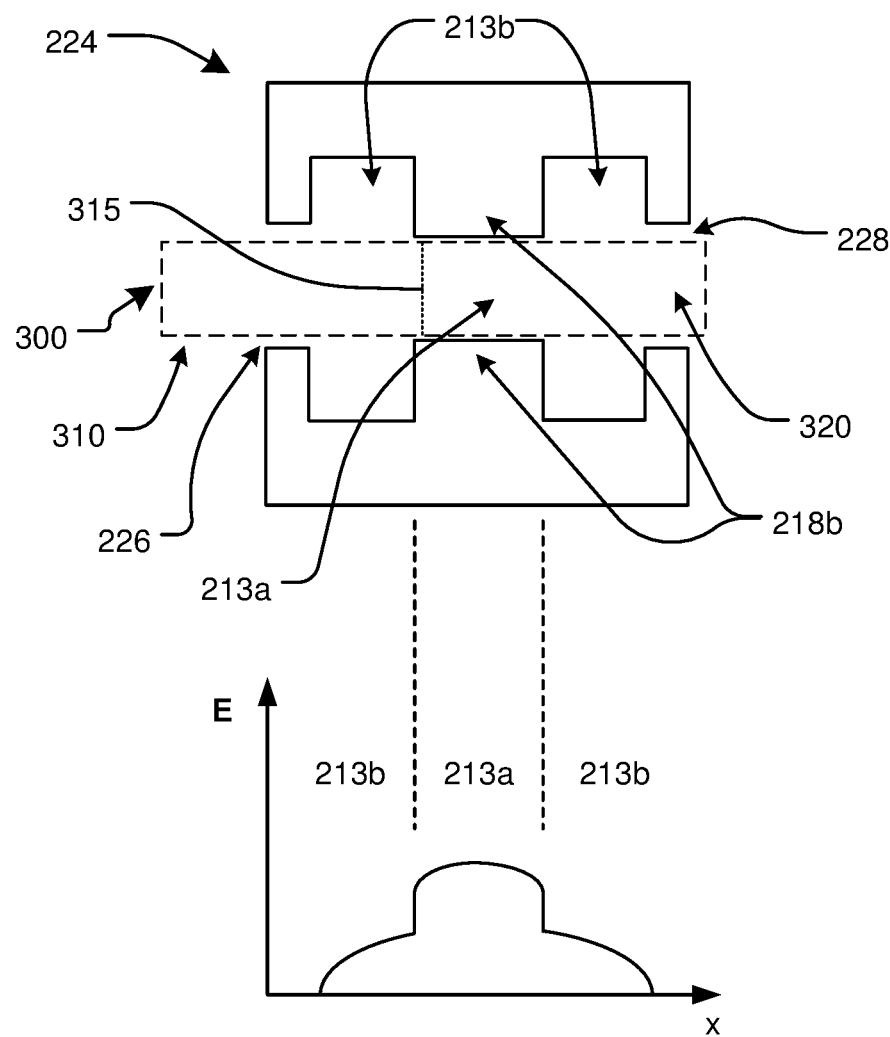
FIG. 5e is a cross-sectional view of the capacitive loaded section of FIGS. 5a to 5c taken along lines 5A-5A of FIGS. 5a and 5c.
FIG. 5f is an illustrative plot of electric field strength of a microwave standing wave within the capacitive loaded section of FIG. 5e.

FIG. 5f shows the electric field strength for a standing wave component with a transverse electric field ($TE_{01}$ mode) in the capacitive loaded section 224 with cross-section shown in FIG. 5e. FIG. 5f illustrates that the expected electric field strength in a plasma in the gap 213a between the ridges 218 is higher than in the adjacent cavity arm regions 213b in the cavity 214. By placing at least a portion of the plasma torch 300 in gap 213a that has a higher electric field strength between the ridges, better coupling between the electromagnetic field and the plasma inside the torch 300 may be obtained.

FIG. 5d shows that the standing wave microwave electric field strength is reduced in the longitudinal z direction along the cavity 214. For example, in embodiments where the second end 230 is short circuited, the electric field strength of the standing wave is a maximum at ¼ of the microwave wavelength away from the short and decreases until it is zero at the short. In the gap 213a at recesses 227 between the capacitive loaded section portion 218b where the plasma torch 300 is to be located, the electric field strength of the microwave in the plasma is further reduced compared to the electric field strength in the gap 213c between portions 218c of the capacitive loaded section portions 218b adjacent to the recesses 227, as shown in FIGS. 5c and 5d.

As the torch 300 has a finite width, the electric field strength (of the standing wave component) across the torch width (in the z direction) is asymmetric if the shape of the recesses 227 are symmetric about a longitudinal axis (x) parallel with the length of torch 300, as shown in FIG. 5c. Asymmetric electric field strengths within the plasma torch 300 can lead to undesirable asymmetric plasma cross-sections. For example, this asymmetry is undesirable in that it causes the plasma to be hotter on the side nearer to the microwave source and this imbalance can be so large as to cause the cross-sectional shape of the plasma to form as a crescent instead of a full ring.

In some embodiments, the recesses 227 may be formed in a shape that compensates for the asymmetric electric field strength along the z direction and to thereby create a more uniform electric field strength across the recess 227. Therefore, when the plasma torch 300 is disposed in the capacitive loaded section 224 (or capacitively loaded section), a more uniform electric field strength is achieved than if the recess were symmetric about the longitudinal axis of the plasma torch 300. For example, a more uniform electric field strength may include an at least partially uniform electric field strength across the recess in that more than two regions in the recess that have the same electric field strength.

Although the embodiments of FIGS. 2 to 6 show the recesses 227 as semi-circular or curved (thereby generally defining a circular shape in the cross-section in the y-z plane), it will be appreciated the ridges 218 may instead comprise recesses having cross-sections with other shapes, such as discussed below in relation to FIGS. 7a, 7b, 8a, 8b, 8c, 9a and 9b.

Figure 7A:
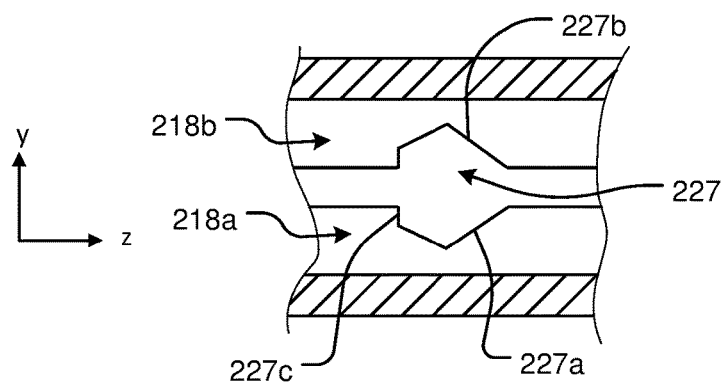
FIG. 7a is a cross-sectional view of a capacitive loaded section of a microwave chamber, according to some embodiments.
Figure 7B:
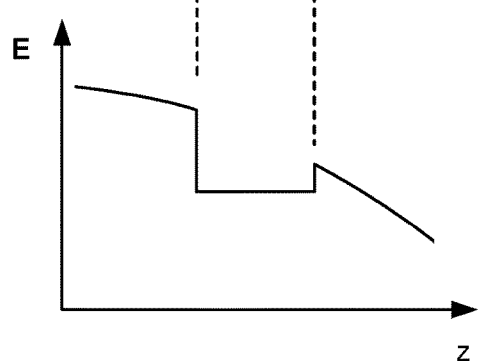

FIGS. 7a and 7b show an example of recesses 227 which have been shaped to have a rotational asymmetry about the transverse axis that extends through the first and second openings 226 and 228 to create a uniform electric field strength in the plasma between the recesses 227. In the illustrated embodiment of FIG. 7a, the recess 227a in the capacitive loaded section portions 218a is defined by three substantially flat surfaces which, together with a corresponding recess 227b in an opposing ridge 218b, define at least part of a pentagon (a semi-pentagonal or semi-diamond-like shape) when the longitudinal cross-section of the ridges 218 (in the y-z plane, or the plane perpendicular to the longitudinal axis of the plasma torch) are taken.

Figure 8A:
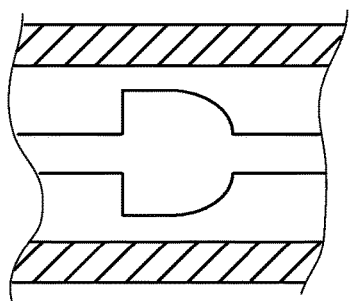
FIGS. 8a, 8b and 8c are cross-sectional views of capacitive loaded sections of microwave cavities, according to some embodiments.
Figure 8B:
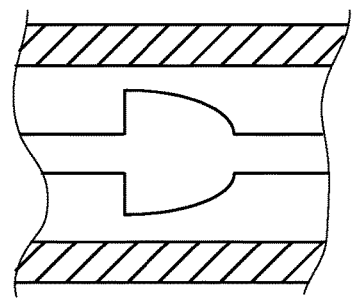
Figure 8C:
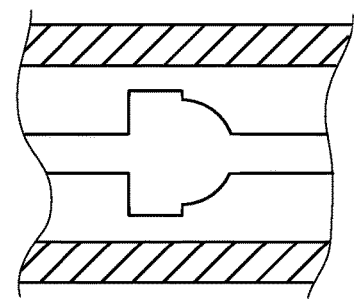

FIGS. 8a, 8b and 8c show a cross-section of the capacitive loaded portion 218b along the plane parallel with the longitudinal axis of the chamber where the recesses 227 define at least a portion of the following shapes an arch (FIG. 8a), a blunt triangle (FIG. 8b), and a combination of a semicircle and rectangle (FIG. 8c). However, it will be appreciated that the recesses 227 of opposing ridges 218 may define any suitable shape such as a polygonal shape.

Figure 9A:
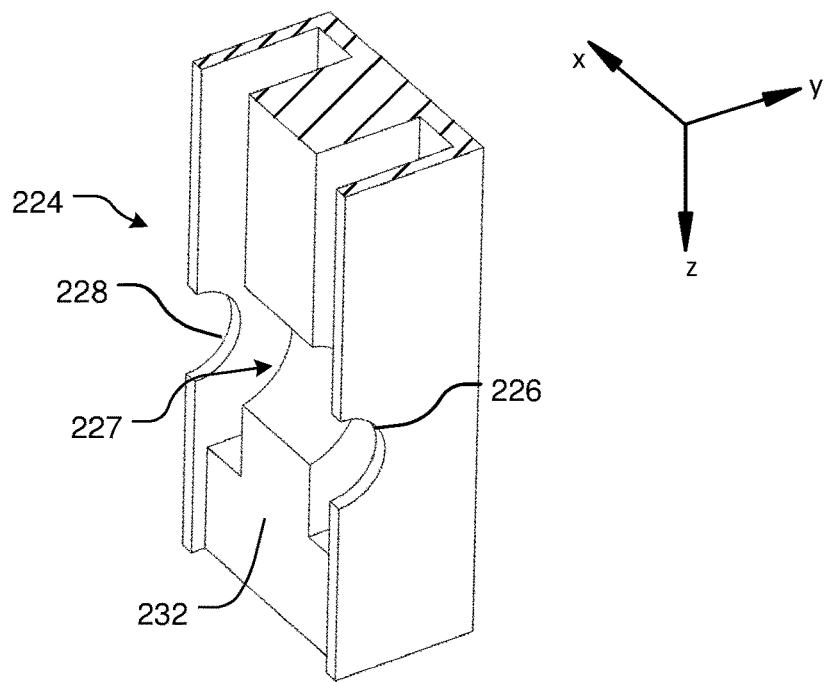
FIG. 9a is a partial section perspective view of a microwave chamber according to some embodiments.
Figure 9B:
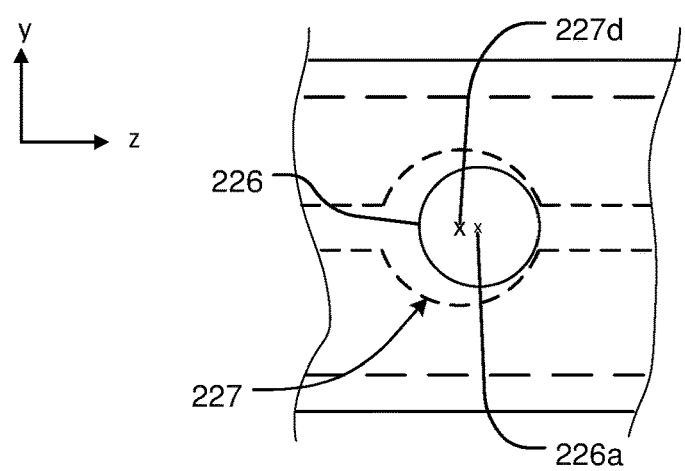

In some embodiments, as shown in FIGS. 9a and 9b, the recess 227 may define a semicircular shape in cross section with a rotational axis 227d that is substantially parallel and offset along the z-axis relative to the axis 226a between the first opening 226 and the second opening 228. For example, the rotational axis 227d extending through the recess 227 may be offset such that it is intermediate the first end 220 of the microwave chamber 200 and the axis 226a. Referring to FIG. 9b, when a plasma torch 300 is received in the openings 226, 228 and the recess 227, a longitudinal side or wall of the torch 300 (and therefore the plasma within the torch) that is closer to the first end 220 (the upstream side) is separated or displaced from a side of the recess 227 that is closer to the first end 220 by a distance that is greater than the distance between the wall or side of the torch 300 that is closer to the second end 230 (the downstream side) and the portion of the recess 227 that is closer to the second end 230. Referring back to FIG. 5d, the variation in the electric field strength in the plasma in the side closer to the second end 230 (further along the z direction) is much less than the variation on the side closer to the first end 220. Therefore, in embodiments with the recess 227 located as shown in FIGS. 9a and 9b, there may be a more uniform electric field strength in the plasma. In such embodiments, the shape defined by recess 227 may have an area that is larger than the cross-sectional area of the torch 300 in order to receive the torch 300 in the recess 227.

Figure 10:
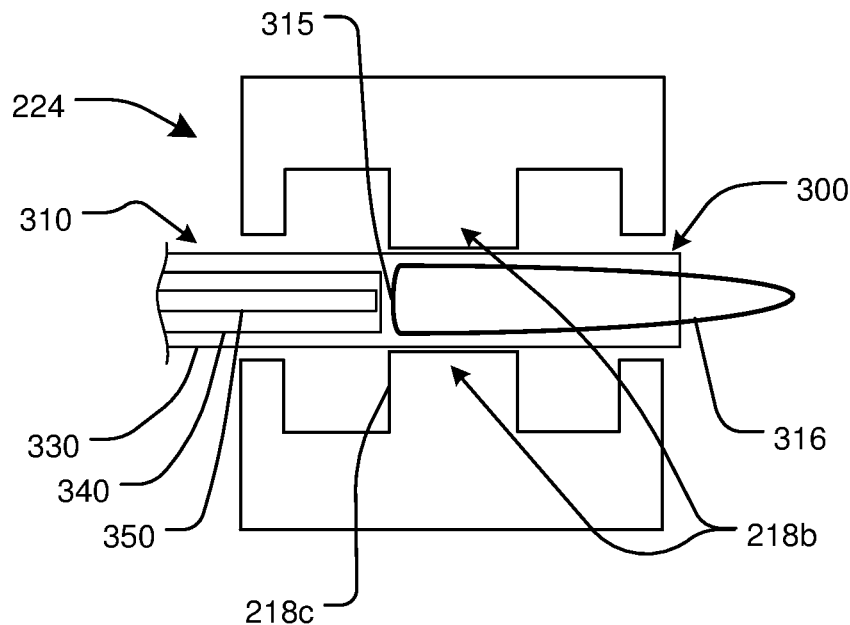
FIG. 10 is a cross-sectional end view of a plasma torch positioned within the capacitive loaded section of FIG. 5a, according to some embodiments.

Referring to FIG. 10, there is shown an exemplary plasma torch 300. The plasma torch 300 may include several concentric tubes of a high dielectric material such as quartz or ceramic to create and direct multiple distinct gas flows. As shown, the plasma torch 300 comprises an outer tube 330 extending along the length of the torch 300 and arranged to receive the plasma. The plasma torch 300 comprises an inner tube 350 disposed within and substantially concentrically with the outer tube 330. The inner tube 350 extends at least partially through the outer tube 330 from the receiving end 310. In some embodiments, the plasma torch 300 may comprise an intermediate tube 340 disposed within the outer tube 330 and the inner tube 350 may be located within the intermediate tube 340. The outer tube 330, the inner tube 300 and the intermediate tube 340 may be concentrically aligned. The intermediate tube 340 may extend partially through the outer tube 330 from the receiving end 310 such that the open downstream end of the intermediate tube 340 is close to and further downstream from the open downstream end of the inner tube 350. The outer tube 330 is adapted to receive a plasma forming gas from the gas source 400. The inner tube 350 feeds the carrier gas with an entrained sample to be analysed into the outer tube 330. The dielectric constant of inner tube 350 is higher than that of its surroundings and the electric field strength near inner tube 350 is therefore increased. The intermediate tube 340 may be adapted to feed an auxiliary gas into the outer tube 330 to assist in keeping the plasma 316 away from the open downstream ends of the inner tube 350 and the intermediate tube 340. The plasma torch 300 may, for example, be a Fassel torch.

In some cases, when the torch 300 is positioned inside a conventional rectangular waveguide, the formed plasma 316 may contact end of inner tube 350 which erodes it and eventually destroys the inner tube 350 and thus the torch 300. However, by locating the plasma torch 300 in the capacitive loaded section 224 of the microwave chamber 200 such that the open downstream end of inner tube 350 (adjacent to the initiation portion 315) stops just short of the upstream edge 218c of the ridges 218b as shown in FIG. 8. The initiation portion 315 of the formed plasma 316 may be located in or near the high electric field region 213a (see FIGS. 5e and 5f) while the inner tube 350 of the torch remains in the region of lower electric field and separated from the plasma 316. Even allowing for the torch tubes 330 and 350 increasing the nearby electric field strength, the electric field strength can still remain low enough to significantly reduce the risk of plasma 316 contacting the inner tube 350.

Figure 11:
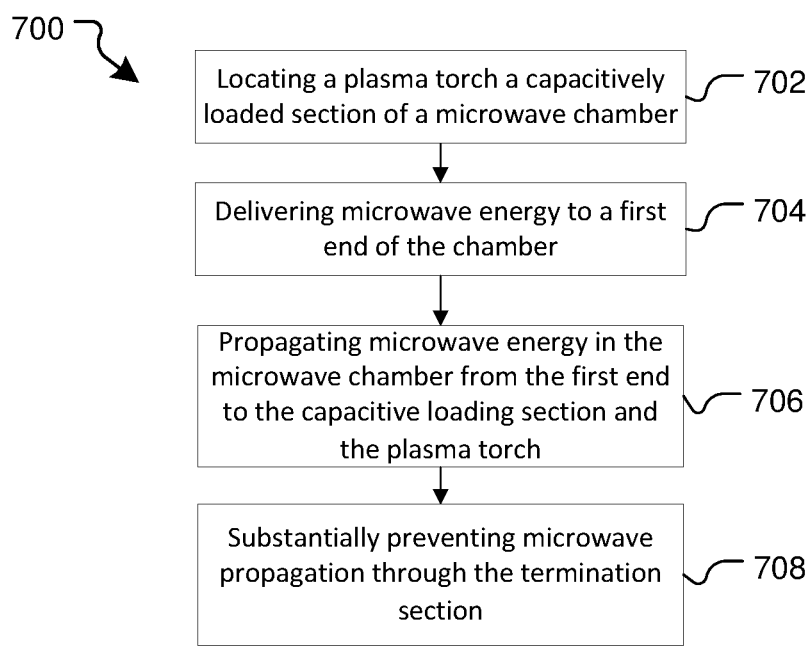
FIG. 11 is a process flow diagram of a method of microwave-stimulated plasma generation.

Referring to FIG. 11, there is shown a method for microwave-stimulated plasma generation according to some embodiments. The method may be implemented in the microwave chamber 200 described above. The method 700 comprises locating a plasma torch 300 comprising a plasma forming gas in a capacitive or capacitively loaded section 224 of a microwave chamber 200, at 702, delivering microwave energy to a first end 210 of the chamber 200, at 704 and propagating the microwave energy from the first end 210 to the capacitive loaded section 224 and the plasma torch 300 to generate and sustain a plasma in the plasma torch 300, at 706.

In some embodiments, the method further comprises substantially blocking propagation of microwave energy through a second end 230 of the chamber while allowing passage of optical light through an end aperture 240 disposed in the second end, at 708.

In some embodiments, locating the plasma torch 300 in the capacitively loaded section 224 comprises disposing the plasma torch in the capacitive loaded section 224 such that it extends across a width of a cavity of the chamber 200, along an axis substantially perpendicular to the longitudinal axis of the chamber 200. In some embodiments, locating the plasma torch 300 in the capacitively loaded section 224 further comprises locating a portion of the plasma torch 300 within a recess 227 defined by at least one of one or more ridges 218 disposed in the capacitive loaded section 224. For example, in some embodiments, at least a portion of the plasma torch 300 may be disposed between a first ridge 218 in the capacitive loaded section 224 and a second ridge 218 opposing the first ridge 218.

The combination of magnetic and electric field pattern which is capable of initiating and sustaining the plasma exists over a significant length of the axis extending through first opening 226 and the second opening 2228, i.e., the x axis dimension of the cavity but is relatively stronger in a region comprising the ridge 218 than outside the ridge 218. The initiation portion 315 where the plasma initiates is determined by a location of the torch 300 and the gas flows within the torch 300 and may be adjusted by moving the plasma torch further into or out of the cavity 214 along the x axis. If the torch 300 is positioned such that the intermediate tube 340 is placed between an outer wall of the chamber 200 and a nearest edge of the ridge 218, then the intermediate tube 340 is in a region where the fields are relatively lower. Assuming it is not too far from the ridge 218, the plasma is more likely to form at a point where the field abruptly rises at the start of the ridge 218 and accordingly, the plasma is less likely to move back to the inner tube and over heat it. If the torch 300 is pulled out too far (the inner tube 350, for example, being positioned completely outside the cavity) the gas flows in the torch 300 are less likely to be conducive to formation of a plasma and the plasma probably will not light. In some embodiments, the initiation point is approximately 0-5 mm from the inner tube 350 of the torch 300 and accordingly, locating the inner tube 350 of the torch 300 between approximately 0 and 5 mm from an edge of the ridge 218, the plasma is likely to form at the edge of the ridge 218.

In some embodiments, locating the plasma torch 300 in the capacitively loaded section 224 comprises disposing the plasma torch such that the open downstream end of the inner tube 350 of the plasma torch 300 (adjacent to the initiation portion 315) stops just short of an upstream edge 218c of the one or more ridges 218b, as shown in FIG. 10. For example, the plasma torch 300 may be positioned such that an end of the inner tube of the plasma torch 300 is located substantially between the first wall 212a of the capacitive loaded section 224 and the one or more ridges 218 nearest to the first wall 212a.

In an exemplary embodiment where the microwave chamber 200 is configured to receive and propagate microwaves at a frequency of about 2.45 GHz, the capacitive loaded section portion 218b of ridge 218 may have a ridge width ($W_R$) of about 14 mm and the capacitive loaded section 224 may have a cavity width ($W_{RC}$) between 24 mm and 36 mm and a cavity height ($H_{RC}$) of about 34 mm. The ridges 218 may extend from the major walls 212a, 212b of the internal wall structure 212 such that the ridge height is about 14 mm ($H_R$) and thereby leave a gap 213a between the opposing ridges of about 6 mm. The distance between the initiation portion 315 of the plasma and the location at which the plasma can be sampled by the spectrometer 600 (therefore the distance the plasma can potentially cool over) is reduced to only about 24-28 mm (assuming a 3 mm chamber wall thickness). This is much smaller than the 50-60 mm distance the plasma can cool over if the torch were placed in a conventional rectangular waveguide with a 72 mm wide cavity and a 3 mm wall thickness. The spectrometer 600 may be coupled to the plasma produced in the capacitive loaded section 224 with a separation of only 8-10 mm from the nearest portion of the plasma torch 300 that absorbs microwave energy in the cavity 214. This separation would be 20-30 mm if the plasma torch 300 were placed in a conventional rectangular waveguide with a 72 mm wide cavity and a 3 mm wall thickness.

In some embodiments, the microwave chamber 200 may be integrally formed using known techniques such as machining or forging from a block of metal, casting or 3D printing. The ridges 218 and microwave cut-off structure 232 may be integrally formed together or may be separately formed and attached to the walls of the cavity 214. In some embodiments where the ridges 218 and/or microwave cut-off structure 232 are separately formed, the ridges 218 and/or microwave cut-off structure 232 may be formed from a different material to the rest of the cavity 214. In some embodiments, the ridges 218 are separately formed from a dielectric material. If the dielectric material is transparent to microwaves, in some embodiments, the microwave chamber 200 may include a single dielectric ridge that spans the entire height of the cavity ($H_{RC}$). Although the dielectric is transparent to microwaves, the dielectric ridge may still affect the capacitance so that the capacitive loaded section 224 can provide microwaves for plasma generation. In embodiments where the ridges 218 are formed from a dielectric material that is transparent to microwaves, there may be a single ridge 218 that spans the height of the cavity 214 so that there is no gap between the major surfaces 212a, 212b except where the recess 227 is provided to accommodate the plasma torch 300.

In some embodiments, the capacitive loaded section 224 may be provided as a separate or discrete component. The capacitive loaded section 224 may be attached to other components of the chamber 200 such as the first end 220, the transition or impedance matching section 222 and the second end 230 as described herein. The components can be attached to each other by any suitable means which allows for electrical conduction between the internal wall structures 212 of each component. In some embodiments, the capacitive loaded section 224 is adapted to be coupled to the other components by providing flanges (not shown) to accommodate fixing components such as bolts or screws. Alternatively, the capacitive loaded section 224 may be integrally formed with any one of or all of the first end 220, impedance matching section 222 and the second end 230.

In some embodiments, the microwave chamber 200 is assembled from separate transverse sections that, for example, match any one of the cross-sections shown in FIGS. 3a, 6a and 9a. The transverse sections are connected to another transverse section. In the embodiments shown in FIGS. 6a and 9a, the other section may be a mirror image of it. The transverse sections may be adapted to be attached to each other, for example by providing flanges, lips and/or tapped holes to accommodate fixing components such as bolts or screws. In other embodiments, the transverse sections may be soldered or welded together.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising" will be understood to imply the inclusion of a stated element, integer or step, or group of elements, integers or steps, but not the exclusion of any other element, integer or step, or group of elements, integers or steps.

The invention claimed is:

1. A microwave chamber for plasma generation comprising:
   a launch structure at a first end of the microwave chamber, the launch structure defining a source opening that is configured to receive a microwave source for producing microwave energy;
   a termination section at a second end of the microwave chamber opposite the first end, the termination section configured to substantially block propagation of the microwave energy from the second end of the chamber;
   an internal wall structure for guiding the microwave energy generated by the microwave source from the first end toward the second end of the microwave chamber, the internal wall structure at least partially defining a cavity configured to house an antenna of the microwave source when the source opening receives the microwave source, wherein the internal wall structure comprises:
   an impedance matching section intermediate the first end and the second end:
   a capacitive loaded section intermediate the impedance matching section and the second end; and
   at least one ridge extending at least partially through the impedance matching section and the capacitive loaded section along a longitudinal axis of the chamber, wherein
   the capacitive loaded section defines a first opening extending through a first minor wall and a second opening extending through a second wall, the second opening and the first opening being opposite each other to receive a plasma torch in the capacitive loaded section along a second axis when the antenna of the microwave source is positioned in the cavity of the microwave chamber, the second axis extending through the first opening and the second opening.

2. The microwave chamber according to claim 1, wherein the at least one ridge is disposed along a centerline of the chamber.

3. The microwave chamber according to claim 1, wherein the at least one ridge comprises a first ridge projecting into the cavity and a second ridge projecting into the cavity, wherein the second ridge is opposite the first ridge.

4. The microwave chamber according to claim 1, wherein the capacitive loaded section comprises a rectangular section comprising a first major wall, a second major wall, the first minor wall, and the second minor wall, wherein the at least one ridge of the internal wall structure is disposed along at least one of the first major wall and the second major wall.

5. The microwave chamber according to claim 4, wherein the first major wall and the second major wall are to each other.

6. The microwave chamber according to claim 5, wherein the first minor wall and the second minor wall are opposite to each other.

7. The microwave chamber according to claim 6, wherein each of the first major wall and the second major wall extends from the first end to the second end of the microwave chamber.

8. The microwave chamber according to claim 6, wherein each of the first minor wall and the second minor wall extends between the first major wall and the second major wall.

9. The microwave chamber according to claim 1, wherein the at least one ridge extends along the capacitive loaded section and along at least part of the impedance matching section.

10. The microwave chamber according to claim 1, wherein the at least one ridge comprises a capacitive loaded section portion extending along a length of the capacitive loaded section and the at least one ridge comprises a tapered portion extending along a length of the impedance matching section and tapering toward the launch structure.

11. The microwave chamber according to claim 10, wherein the tapered portion of the at least one ridge tapers in at least one of height and width along its length.

12. The microwave chamber according to claim 1, wherein the impedance matching section tapers toward the capacitive loaded section to facilitate propagation of microwave energy received at the first end of the microwave chamber into the capacitive loaded section.

13. The microwave chamber according to claim 12, wherein the capacitive loaded section comprises a rectangular section comprising a first major wall, a second major wall, the first minor wall, and the second minor wall, wherein the at least one ridge of the internal wall structure is disposed along at least one of the first major wall and the second major wall.

14. The microwave chamber according to claim 1, wherein the impedance matching section comprises at least one of a stub or post disposed within the cavity to allow an impedance of the cavity in the impedance matching section to be selectively adjusted.

15. The microwave chamber according to claim 1, wherein the at least one ridge comprises a capacitive loaded section portion extending along a length of the capacitive loaded section, the capacitive loaded section portion defining a recess that is positioned relative to the first opening and the second opening to accommodate the plasma torch when the first opening and the second opening receive the plasma torch.

16. The microwave chamber according to claim 15, wherein the recess is shaped to compensate for asymmetric electric field strength across the recess.

17. The microwave chamber according to claim 15, wherein the recess is shaped to have a rotational asymmetry about the second axis extending though the first opening and the second opening.

18. The microwave chamber according to claim 15, wherein the recess defines at least a part of a rounded shape having a central axis that is parallel and offset from the second axis that extends through the first opening and the second opening.

19. The microwave chamber according to claim 1, wherein the at least one ridge comprises a first ridge projecting into the cavity and including a first capacitive loaded section portion extending along a first length of the capacitive loaded section and a second ridge projecting into the cavity and including a second capacitive loaded section portion extending along a second length of the capacitive loaded section, wherein the first capacitive loaded section portion is opposite the second capacitive loaded section portion, wherein the first capacitive loaded section portion defines a first recess and the second capacitive loaded section portion defines a second recess and wherein the first recess and the second recess cooperate with the first opening and the second opening to receive the plasma torch.

20. The microwave chamber according to claim 19, wherein the first recess and the second recess cooperate with one another to define a shape in the form of a circle, a polygon, an arch, a blunt triangle, or a combination of a semicircle and a rectangle.

21. The microwave chamber according to claim 1, further comprising a viewing port disposed in the termination section and wherein the termination section is further configured to allow passage of visible and ultraviolet light through the viewing port.

22. The microwave chamber according to claim 21, wherein the viewing port spans only a portion of the cavity to allow for side-on viewing of a portion of the plasma torch extending between the first opening and the second opening, and wherein the termination section comprises a C-shaped cross-sectional profile.

23. The microwave chamber according to claim 1, wherein the second axis is perpendicular to the longitudinal axis of the microwave chamber.

* * * * *